May 18, 1943     H. TORMYN     2,319,373

METHOD OF MAKING METAL ARTICLES

Filed Oct. 16, 1941     2 Sheets-Sheet 1

Inventor
Herman Tormyn
By Blackmore, Spencer & Flint
Attorneys

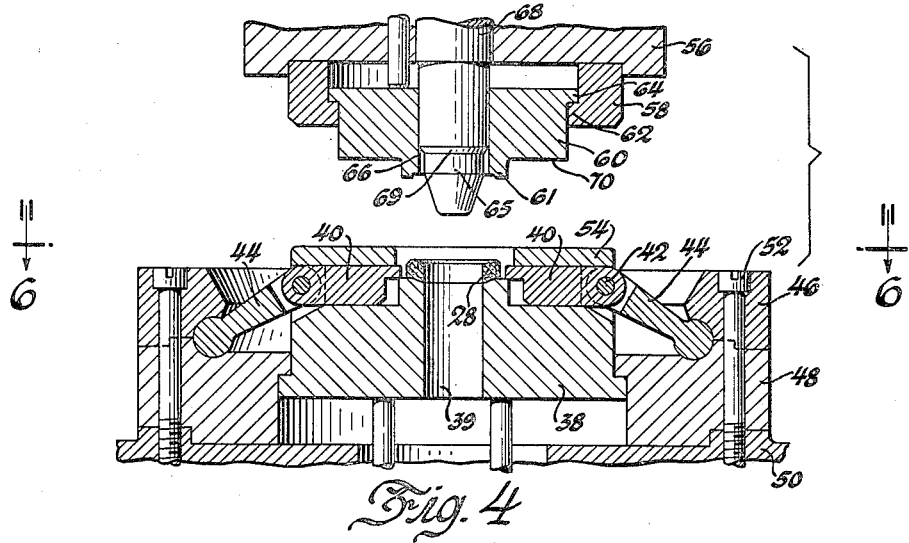
Fig. 4
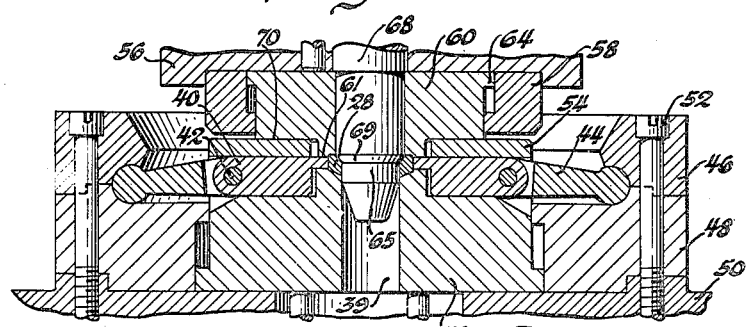
Fig. 5
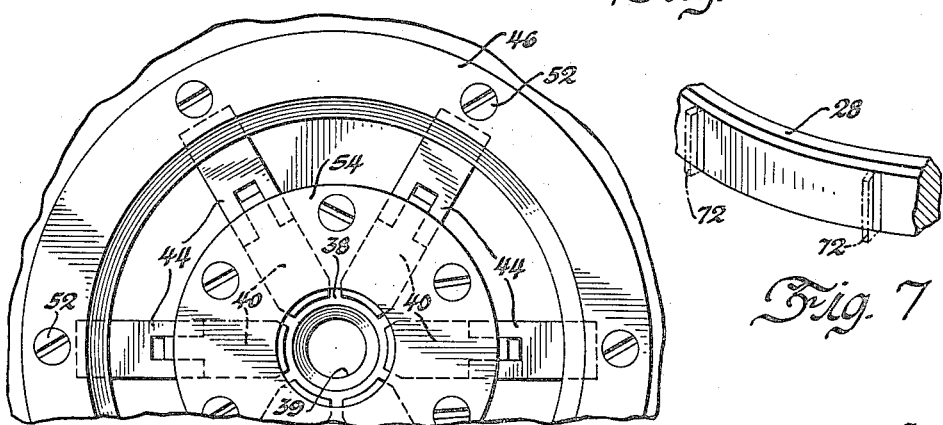
Fig. 6
Fig. 7
Inventor
Herman Tormyn Patented May 18, 1943

2,319,373

UNITED STATES PATENT OFFICE 2,319,373

METHOD OF MAKING METAL ARTICLES

Herman Tormyn, Detroit, Mich., assignor to General Motors Corporation, Detroit, Mich., a corporation of Delaware Application October 16, 1941, Serial No. 415,189

4 Claims. (Cl. 75—22)

This invention has to do with a method of making articles out of metal, particularly out of iron and steel, and with the articles so made.

It is common to manufacture parts by pressing them out of powdered metal and sintering the pressed shapes. Although this method eliminates expensive machining operations such as are required in the manufacture of parts made by more conventional methods from castings or forgings, its applications are somewhat limited due to the cost of the powdered metal required.

I have found that strong, durable articles may be made out of pieces of metal such as chips, turnings, shavings, borings, small chunks, etc., of various sizes by means of pressing the metal fragments together into approximately the shape desired and thereafter heating the partly formed pieces in a controlled or protecting atmosphere to sintering temperatures sufficient for hot pressing and thereafter pressing them to the desired final shape. Chips, turnings, shavings, borings, etc., of metal are available in large quantities and at low cost as scrap resulting from machining operations. The chips, turnings, shavings, borings, etc., may be used just as they come off the parts being machined, although, if desired, the metal may be cleaned before pressing. Where cutting oils have been used in the machining operation it is desirable in order to recover as much of the oil as possible to subject the chips, turnings, shavings, borings, etc., to a centrifugal cleaning operation to remove as much as possible of the cutting fluid. In commercial production it has been found advantageous to crush or granulate the metal scrap so that the resulting product is more uniform in size.

Reference is herewith made to the accompanying drawings, in which:

Figure 4 is a section through a press in which the heated parts are subjected to a final shaping operation, the several parts being in their relative positions prior to the pressing operation, with the heated part therein.

Figure 5 is a view of the press of Figure 4 with the parts as they appear at the end of the pressing operation.

Figure 6 is a view taken on line 6—6 in Figure 4.

Figure 7 is a perspective view of a portion of an article formed by the process illustrated in Figures 1 to 6 inclusive.

Figure 1:
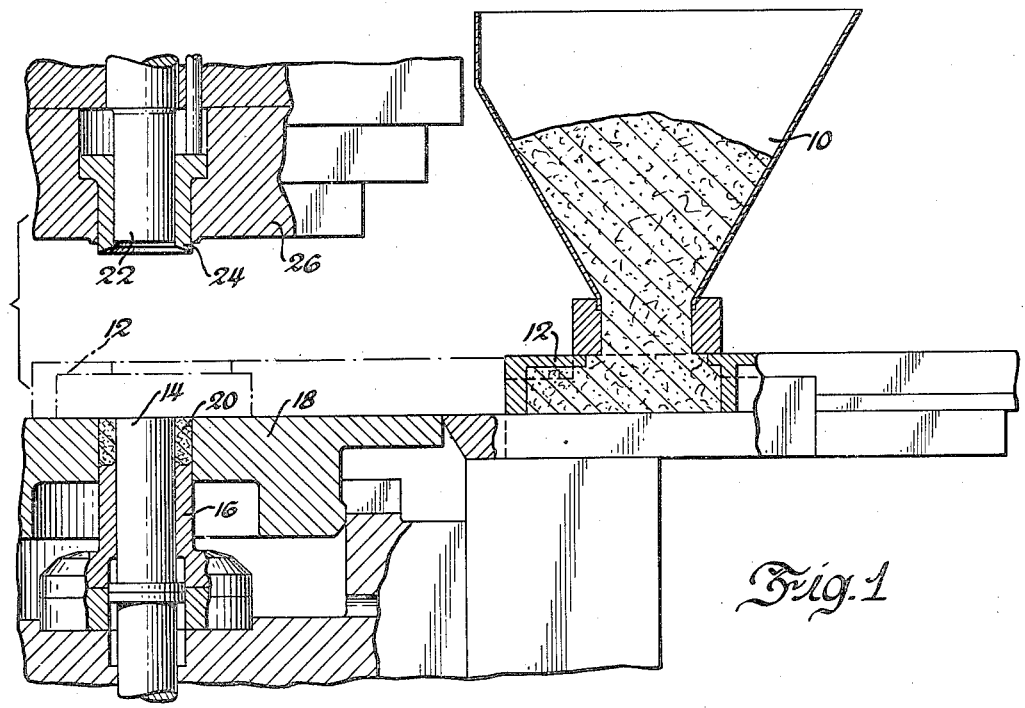
Figure 1 is an elevational view with parts in section illustrating a press which may be used in forming an annularly-shaped part; this view illustrating also a die loading means and showing the die cavity filled with loose metal particles.
Figure 2:
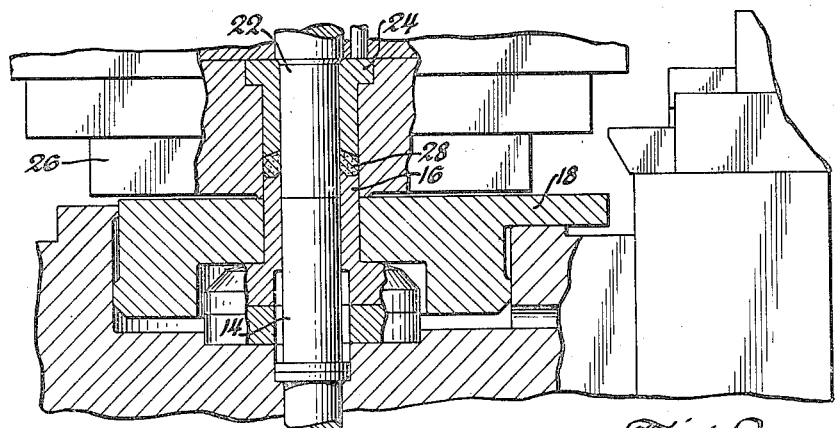
Figure 2 is a view generally similar to Figure 1 showing the relative position of the parts as they appear at the end of the pressing operation.

Referring to Figure 1, 10 indicates a hopper partially filled with crushed chips, turnings, borings, shavings, small chunks, etc. Beneath the hopper is a slide 12 adapted to be reciprocated to fill the cavity formed by die elements 14, 16 and 18 with non-compacted metal 20. After the cavity is filled the upper elements 22, 24 and 26 of the press are moved downwardly to compress the metal fragments. Figure 2 illustrates the relative positions of the several parts at the end of the pressing operation with the roughly shaped article indicated at 28. This operation in the construction illustrated in the drawing reduces the volume of the non-compacted metal in the filled die cavity in the ratio of about three to one. The operation is preferably performed without the application of external heat, although, if desired the dies may be heated. The press employed may be of conventional hydraulic or other type. Pressures of from 30 to 50 tons per square inch have been employed.

Figure 3:
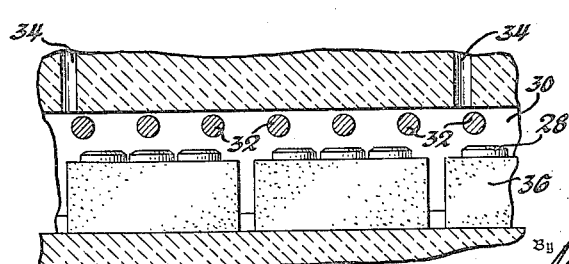
Figure 3 is a sectional view illustrating diagrammatically the roughly shaped articles resulting from the pressing operation passing through a sintering furnace.

Following the pressing operation, the roughly shaped article 28 is heated to a sintering temperature. In the case of iron and steel temperatures in the neighborhood of about 1850°–2050° F. may be employed, with temperatures of about 1900°–1950° F. being preferred. In Figure 3 there is shown a sintering furnace 30 heated in any suitable maner as by electrical heating elements 32 and preferably provided with a protective atmosphere, such as hydrogen, through conduits 34. Where the metal fragments may be oxidized slightly it is desirable that a reducing atmosphere be used. The roughly formed articles 28 may be carried through the furnace on any suitable conveyor 36.

The next step consists in pressing the heated articles to final form. In this operation the roughly formed piece is reduced in size to the extent desired. A reduction of about one-third has proven satisfactory in many cases. This pressing operation is for the purpose of consolidating as much as possible the metal fragments in the roughly shaped article and forming a substantially solid piece. Sufficient pressure is employed to obtain a strong article that has little, if any, porosity. In any case the pressure is fairly high and will vary with the article being formed. Any suitable conventional hydraulic or other type press may be used.

The hot pressing may be performed by pressing the heated article by means of dies such as those illustrated in Figures 4 and 5. The heated article after being removed from the sintering furnace is placed on lower die element 38 having bore 39 therein of the same diameter as the inner dimension of the article. Cooperating with element 38 and slidably mounted thereon are a plurality of similar segmental die elements 40 having arcuate faces for shaping the article to final form. For simplicity of illustration each die element 40 is shown in the drawings as formed of one piece, although it will be obvious that in commercial practice it will be desirable to form the work engaging portion of each die element 40 as a separate replaceable member to take care of wear or breakage. Each die element 40 is pivoted at 42 to one end of an arm 44, the opposite end of each arm being mounted for pivotal movement in members 46 and 48 secured together and to support 50 by means of bolts 52. Die element 38 is mounted for movement with respect to member 48 until the lower face thereof contacts the upper portion of support 50. Carried on the several segmental die elements 40 is an annular element 54.

The upper elements of the press include a support 56 and a ring-shaped member 58 movable therewith. Carried by the ring-shaped member 58 is an upper die element 60 having a work contacting portion 61. The ring-shaped member 58 has an inwardly extending flange 62 cooperating with an outwardly extending flange 64 of the upper die element 60. The upper die element and ring-shaped member 58 are movable relative to each other, the cooperating flanges on these parts acting as a limit stop means. Extending through support 56 and having its lower portion 65 extending through an opening 66 in the upper die element 60, is a plunger 68 movable with the support 56. The plunger has a tapered portion 69 adapted to shape the inner portion of the upper face of the article to be formed. For simplicity of illustration the plunger is shown as formed of a single piece, although it will be appreciated that where a large number of parts are to be made it will be desirable to form the plunger of a plurality of parts in order that the portion thereof subjected to wear may be replaced readily.

In the hot pressing operation, members 56, 58, 60 and 68 move downwardly together until a lower portion 70 of die part 60 contacts the annular element 54 carried by the segmental lower die elements, whereupon die part 60 moves relative to parts 56, 58 and 68, these latter parts continuing their downward movement and lower portion 65 of plunger 68 passing through the opening in the article and into the bore 39 in die element 38. Upon continued movement of the press the upper portion of die element 60 contacts the lower surface of support 56 and thereupon elements 56, 58, 60 and 68 move together, the lower portion 70 of die element 60 pressing annular element 54 downwardly which in turn presses the segmental dies downwardly and hence also die element 38. During this movement the segmental dies move radially inward on the top surface of die element 38 and press the hot article to final form. The construction and operation are such that when segmental die elements 40 first engage the heated work that upper and lower die elements 60 and 38, respectively, and plunger portions 65 and 69 contact and support the article, the article thus being supported and pressure being applied thereto both axially and laterally. Most of the shaping is done by the radially moving jaws and a small amount by portion 69 of the plunger. The segmental die elements 40 permit a small amount of the heated metal to flow outwardly between the several segments and form small fins 72. This arrangement takes care of small variations in the quantity of metal in the heated shape. In the article shown the several fins are removed by a simple shearing operation, although, if desired, where the shape of the article permits, these fins may be left as a part of the final article. In practice also, it is preferred to provide a suitable cooling means (not shown) to cool the hot pressing dies.

In general, it will be possible to make by this process any articles that can be shaped in dies. Examples are hardware of various sorts, levers, brake drums, containers, covers, sleeves, rings, cylinders, etc. Owing to the relatively low cost of the chips, turnings, shavings, borings, small chunks, etc. used in manufacture and the great reduction in machining and finishing operations the costs of the final articles are greatly reduced as compared with articles made by present methods of manufacture such as casting, drop forging, machining and so on. It is also possible to make composite articles by the present method by compressing the metal fragments under high pressure in contact with sheets, plates, bars or other shapes, followed by sintering and a subsequent hot pressing operation. It has been found that an excellent bond can be obtained between sheet metal, etc. and the compressed metal fragments.

Articles made by the present invention from low carbon screw machine steel scrap (S. A. E. 1112) have an average strength of more than three times that of similar articles formed of gray iron by casting the molten metal and machining the resultant casting to size in accordance with conventional methods. Close examination of an etched surface of a steel article made by the present invention reveals the outlines of the metal particles from which the part was made, but to the casual observer the part has no different appearance than if made in the ordinary manner as by forging and machining.

In commercial practice it is highly desirable that the metal fragments be of substantially uniform size. This facilitates the operation of filling the die cavity with the non-compacted particles and insures that practically the same weight of metal will be loaded in the cold pressing dies in each actuation of the die loading slide 12, reciprocating beneath the hopper 10 holding the metal fragments. In other words, the volume of the die cavity is constant and is filled to the top by means of the slide 12. Thus by providing metal fragments of uniform size the same volume will always be of substantially uniform weight. Accordingly, it is desirable to subject the metal chips, turnings, shavings, borings, small chunks, etc. to a crushing operation to make them of substantially uniform sizes before filling the hopper 10. For this purpose a sling hammer mill having a ⅛" grating through which the metal fragments must pass has been used with success.

Parts made according to my method may be given various treatments the same as parts of similar material made by conventional methods. For example the parts may be plated with various metals as desired. Parts made of steel fragments by the present process may be carburized, nitrided or otherwise heat treated the same as similar parts made of steel of similar analysis by conventional methods.

This application is a continuation-in-part of my copending application Serial No. 274,292, filed May 17, 1939, now Patent No. 2,287,951, dated June 30, 1942, and the procedures described therein may be employed, where desired, in place of the specific procedure described herein.

I claim:

1. The process of forming ferrous metal articles which comprises crushing ferrous metal chips, turnings, shavings, borings, small chunks, etc. to form granulated particles of substantially uniform size, placing a supply of the granulated material in a hopper, intermittently feeding a measured quantity of said material to and filling a die cavity therewith, compressing the material in the die cavity under high pressure to form an article of approximately the size and shape of the final article, removing said approximately shaped article from the die, heating said approximately shaped article to a temperature within the range of 1850° to 2050° F. in a non-oxidizing atmosphere, and pressing said heated article in dies which support and contact the metal both axially and laterally during the entire pressing operation and shape the metal to the final form desired, said dies having segmental jaws which move radially inward during the pressing operation and permit any slight excess material to flow outward between the segmental jaws.

2. The process of forming metal articles from scrap metal which comprises crushing scrap metal chips, turnings, shavings, borings, small chunks, etc., to form granulated fragments of substantially uniform size, filling a die cavity with a measured quantity of the granulated metal fragments, pressing the granulated metal fragments in the die cavity by means of high pressure into an article of approximately the size and shape of the desired article, heating in a controlled atmosphere said approximately shaped article to a sintering temperature suitable for hot pressing, and thereafter pressing to final form said approximately shaped article in dies which contact and support the heated metal article both axially and laterally during the entire hot pressing operation.

3. The process of forming ferrous metal articles from ferrous metal scrap which comprises crushing scrap ferrous metal chips, turnings, shavings, borings, small chunks, etc., to form granulated ferrous metal fragments of substantially uniform size, placing a measured quantity of the granulated ferrous metal fragments into a die cavity, pressing the granulated metal fragments in the die cavity by means of high pressure into an article of approximately the size and shape of the final article, heating in a non-oxidizing atmosphere said approximately shaped article to a temperature within the range of 1850° F. to 2050° F., and thereafter pressing to final form said approximately shaped article in dies which contact and support the heated metal article both axially and laterally during the entire hot pressing operation.

4. The process of forming an annular member from scrap metal which comprises crushing scrap metal chips, turnings, shavings, borings, small chunks, etc., to form granulated fragments of substantially uniform size, placing a measured quantity of the granulated scrap metal fragments in a die cavity of annular shape, pressing said granulated metal fragments into an annular form of approximately the size and shape of the final article, removing the approximately shaped annular form from the die, heating said approximately shaped annular form in a non-oxidizing atmosphere to a sintering temperature suitable for hot pressing, and thereafter pressing to final annuluar form said approximately shaped annular form in dies which contact and support the heated annulus both axially and laterally during the entire hot pressing operation.

HERMAN TORMYN.